(12) United States Patent
Nakamura et al.

(10) Patent No.: US 7,517,921 B2
(45) Date of Patent: Apr. 14, 2009

(54) INK-JET INK AND RECORDING METHOD USING THE SAME

(75) Inventors: Masaki Nakamura, Akiruno (JP); Hirotaka Iijima, Hachioji (JP); Yoshinori Tsubaki, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 583 days.

(21) Appl. No.: 11/232,780

(22) Filed: Sep. 22, 2005

(65) Prior Publication Data

US 2006/0069182 A1    Mar. 30, 2006

(30) Foreign Application Priority Data

Sep. 29, 2004  (JP)  ............................. 2004-284236
Sep. 30, 2004  (JP)  ............................. 2004-286771

(51) Int. Cl.
*C09D 11/00*    (2006.01)
(52) U.S. Cl. ...................................... 523/160; 523/161
(58) Field of Classification Search ................. 523/160, 523/161
See application file for complete search history.

(56) References Cited

U.S. PATENT DOCUMENTS 6,300,391 B2 * 10/2001 Parazak et al. .............. 523/160

FOREIGN PATENT DOCUMENTS

| JP | 09-087560 A | 3/1997 |
| JP | 09-176533 A | 7/1997 |
| JP | 10-060353 A | 3/1998 |
| JP | 2000-085238 A | 3/2000 |

* cited by examiner

*Primary Examiner*—Edward J Cain
(74) *Attorney, Agent, or Firm*—Frishauf, Holtz, Goodman & Chick, P.C.

(57) ABSTRACT

An ink-jet ink is provided which exhibits excellent ejection stability during printing and results in improved abrasion resistance of text and images formed on various recording media, as well as improved image smoothness by employing an ink-jet ink wherein in the ink jet ink incorporating at least a pigment, water, and fine polymer particles, the ink viscosity ratio $\eta_2/\eta_1$ satisfies the conditions specified by Formula (1) below, and a recording method using the same:

$$0.8 < \eta_2/\eta_1 < 5.0 \quad \text{Formula (1)}$$

wherein $\eta_1$ represents the viscosity of an ink-jet ink at 25° C. which incorporates a viscosity retarding material or incorporates at least a pigment, water, and fine polymer particles, while $\eta_2$ represents the viscosity of the above ink at 25° C. in which water equivalent to 10 percent by weight of the entire ink weight has been evaporated.

10 Claims, 1 Drawing Sheet

INK-JET INK AND RECORDING METHOD USING THE SAME

BACKGROUND

1. Field of the Invention

The present invention relates to an ink-jet ink which exhibits excellent ejection stability during printing and makes it possible to produce printed matter in which formed text and images exhibit improved abrasion resistance and smoothness, and a recording method using the same.

2. Description of the Related Art

In recent years, since an ink-jet recording system makes it possible to easily form images at lower cost, it has been widely applied to various printing and imaging fields such as photographic imaging, various types of the printing, or special printing such as marking or color filters. Specifically, due to the development of ink-jet recording apparatuses capable of performing controlled ejection of minute ink droplets, ink whose color reproduction range, durability, and ejection adaptability have been improved, minute ink droplets, and special ink-jet paper has markedly enhanced the color formation of colorants, and surface glossiness, whereby the image quality is approaching that of silver salt photography.

However, the image recording system which necessitates special ink-jet paper carries problems in which usable recording media are limited, and the cost of the recording media is relatively high. On the other hand, in an office environment, there has been greater demand for a new system capable of performing full color printing on various recording media at high speed without limitation of recording media (for example, plain paper, coated paper, art paper, and dual side printing on plain paper).

To meet the above demands, required is development of an ink-jet ink which is applicable for various recording media, is capable of high speed printing, results in excellent text reproduction and image quality, and further in excellent retention property of formed images, especially excellent image abrasion resistance.

In order to overcome the above drawbacks, proposed have been various methods. One of the methods is the use of a solvent based ink. By employing an oil ink (being a solvent based ink), the drying properties of which is enhanced via incorporation of volatile solvents, it is possible to produce printed matter which exhibits excellent fixing due to its rapid penetration into recording media and short drying time. However, solvents such as ethyl acetate or methyl ethyl ketone result in unpleasant odor and a large amount of volatile solvents are harmful to operators. Under the present situation in which better office environments are required, it is difficult to use the ink as above.

Listed as another method is the use of a hot-melt type ink. The hot-melt type ink incorporates, as a main component, waxes which are in a solid state at room temperature and when heated, melt to decrease viscosity. Ink which is heated and melted in an ink-jet recording head is ejected and after deposition onto a recording paper, it is cooled and thereby solidified to form printed images. The hot-melt type ink exhibits the advantage in which volatile solvents are not employed. However, due to the use of waxes as a main component, when the surface of the formed image is rubbed, abrasion tends to result. Thus, the hot-melt type ink exhibits problems of insufficient abrasion resistance, whereby it is difficult to apply it to permanent printed matter. Further, additional problems occur in which due to high content ratio of solids such as wax as an ink component, formed text and images build up on the recording medium.

Further, known as another method is one which employs an ultraviolet radiation curable ink-jet ink. The ultraviolet radiation curable ink-jet ink is composed of ultraviolet radiation curable monomers and curing initiators as main components. After printing on a recording media, deposited ink droplets are cured upon being exposed to ultraviolet radiation. Due to the above curing, advantages are exhibited in which abrasion resistance against scratching is enhanced, and further, no volatile solvents are needed. However, many of employed ultraviolet radiation curable monomers result in skin irritation and exhibit sensitizing properties, whereby ink itself results in drawbacks for safety. Further, since the content ratio of solids in the ink is relatively high, problems have occurred in which formed text and images build up on the recording medium.

In addition, disclosed as other methods are a number of methods, to employ latex inks incorporating fine polymer particles (refer, for example, to Patent Documents 1-4). It is known that the above latex inks, which are prepared by incorporating fine polymer particles into an ink in which water is a main component, exhibit excellent adaptability to the environment and excellent abrasion resistance, and further make it possible to produce printed matter in which formed text and images do not build up on the recording media. However, when such latex inks are continuously or intermittently used at relatively low humid conditions, poor ejection from recording heads results due to an increase in viscosity caused by drying ink, whereby problems have occurred in which it is not possible to achieve stable ejection. Further, since the content of fine polymer particles is inherently limited, it is not possible at present to achieve sufficient image durability required for printer matter.

(Patent Document 1) Japanese Patent Publication for Public Inspection (hereinafter referred to as JP-A) No. 9-87560

(Patent Document 2) JP-A No. 9-1767533

(Patent Document 3) JP-A No. 10-60353

(Patent Document 4) JP-A No. 2000-85238

In view of the above problems, the present invention was achieved. An object of the present invention is to provide an ink-jet ink which exhibits excellent ejection stability during printing and enhances abrasion resistance of text and images formed on various recording media and image smoothness, as well as a recording method using the same.

SUMMARY

An object of the present invention is to solve the above problems, and the object of the present invention is achievable employing the embodiments below.

(1) An ink-jet ink comprising a pigment, water, fine polymer particles and a viscosity retarding agent.

(2) The ink-jet ink of (1), wherein ink viscosity ratio $\eta_2/\eta_1$ of the ink satisfies the condition specified by following Formula (1):

$$0.8 < \eta_2/\eta_1 < 0.5 \qquad \text{Formula (1)}$$

wherein $\eta_1$ represents the viscosity of ink at 25° C., while $\eta_2$ represents the viscosity of ink at 25° C. in which water equivalent to 10 percent by weight of the entire ink weight has been evaporated.

(3) The ink-jet ink of (1) or (2), wherein the viscosity retarding agent is an amphiphile.

(4) The ink-jet ink of (3), wherein the amphiphile is a polymer having N-substituted acrylamide unit or a polymer having vinyl ether unit.

(5) The ink-jet ink of (3) or (4), wherein the average particle diameter of the amphiphile is 10 to 300 nm.
(6) The ink-jet ink of (3), (4) or (5), wherein the amphiphile is an amphiphilic polymer being a core/shell structure.
(7) The ink-jet ink in any of (1) to (6), wherein the average particle diameter of the fine polymer particles is 10 to 300 nm.
(8) The ink-jet ink in any one of (1) to (7), wherein the content of said fine polymer particles is 5 to 30 percent by weight.
(9) The ink-jet ink in any one of (1) to (8), wherein ink viscosity at 25° C. is 10 to 300 mPa·s.
(10) A recording method comprising the step of ejecting the ink-jet ink in any one of (1) to (9) from a recording head to record an image.
(11) The recording method of (10), wherein an ejection amount of the ink-jet ink is 0.1-2.0 pl per droplet.
(12) An ink-jet ink comprising a pigment, water, and fine polymer particles, wherein ink viscosity ratio $\eta_2/\eta_1$ of the ink satisfies the condition specified by Formula (1) below:

$$0.8 < \eta_2/\eta_1 < 5.0 \qquad \text{Formula (1)}$$

wherein $\eta_1$ represents the viscosity of ink at 25° C., while $\eta_2$ represents the viscosity of ink at 25° C. in which water equivalent to 10 percent by weight of the entire ink weight has been evaporated.

The invention itself, together with further objects and attendant advantages, will best be understood by reference to the following detailed description taken in conjunction with the accompanying drawings.

DESCRIPTION OF THE PREFERRED EMBODIMENTS

Figure 1:
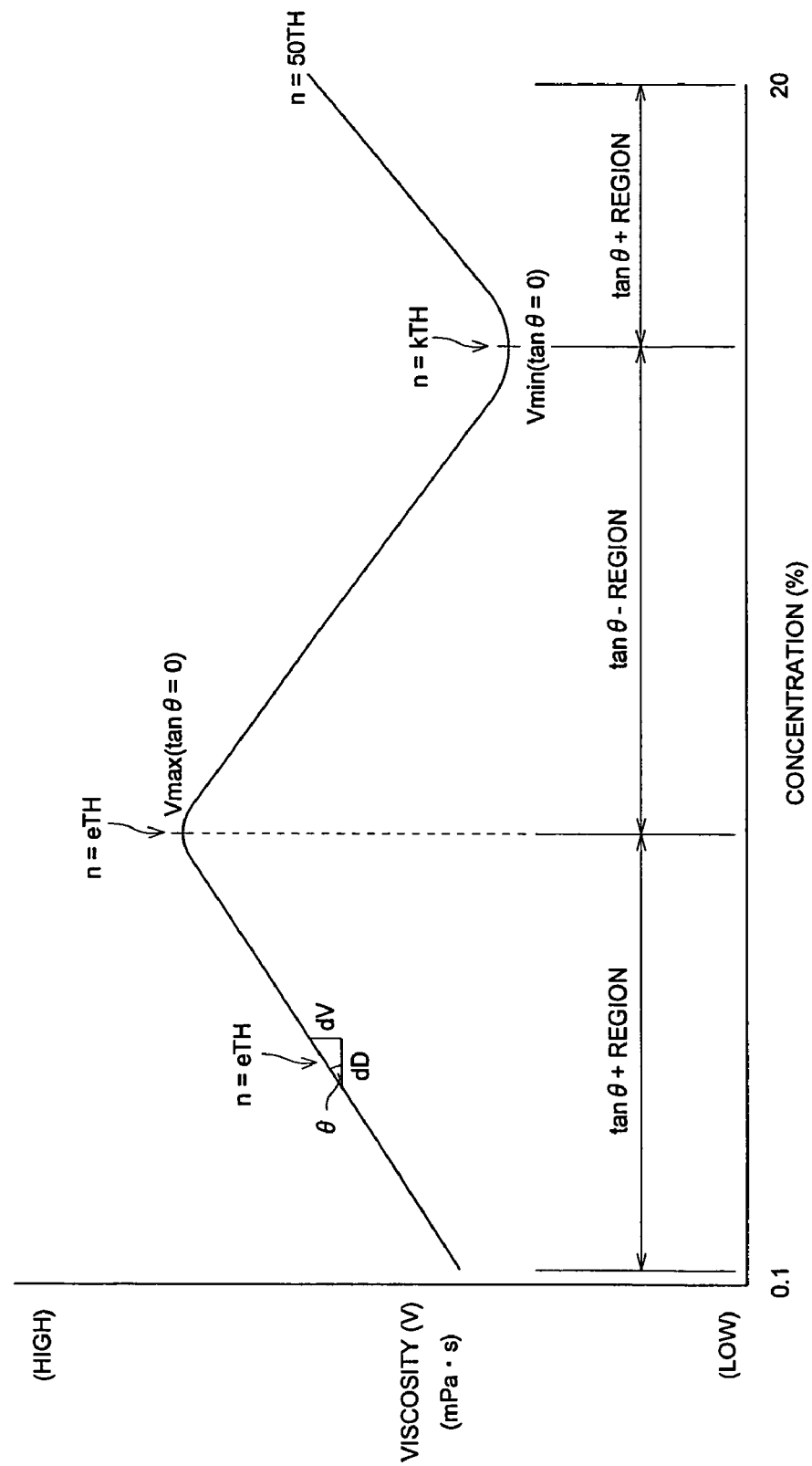
FIG. 1 is a graph showing an example of a viscosity (V)—concentration. (D) curve of the viscosity retarding agent of the present invention.

The present invention will now be detailed.

The ink-jet ink of the present invention is characterized by incorporating viscosity retarding agents together with at least a pigment, water, and fine polymer particles.

Viscosity retarding agents, as described in the present invention, are determined as follows. In cases in which any material is water-soluble, 0.1 percent by weight of an aqueous solution is prepared, while in cases in which it is not water-insoluble, 0.1 percent by weight of an aqueous dispersion is prepared. Subsequently, 0.1 percent by weight of the resulting aqueous solution or dispersion is concentrated by removing water. During the concentration processes in which the concentration reaches 20 percent by weight, the resulting viscosity (in mPa·s) at 25° C. is determined. Viscosity (V) is plotted on the ordinate, while the resulting concentration (D) of the solution or dispersion is plotted on the abscissa, whereby a viscosity (V)—concentration (D) curve is obtained. The above viscosity retarding agents refer to materials (being compounds) exhibiting at least one of the characteristics which passes a region in which viscosity variation (dV) to density variation (dV) in the minute range during the above concentrating process, namely dV/dD=tan θ becomes negative. Specifically, each time when the concentration is changed by 0.2 percent by weight, viscosity is determined, whereby the viscosity (V)—concentration (D) curve is prepared.

FIG. 1 is a graph showing an example of the viscosity (V)—concentration (D) curve according to the present invention.

The graph in FIG. 1 is prepared in such a manner that when concentration is performed from 0.1 to 20 percept by weight in terms of concentration (D), viscosity (V) corresponding to each concentration is plotted. In low concentration regions, the viscosity proportionally increases with an increase in concentration, whereby dV/dD(tan θ) is in the plus region. Subsequently, a region starts in which the viscosity variation with respect to the concentration variation, for example, at the nth point of the concentration becomes "0", namely dV/dD (tan θ)=0. At the above point, the viscosity exhibits the maximum value (Vmax). When the aqueous solution or dispersion is further concentrated, a region starts in which tan θ becomes minus, and subsequently, a region starts in which the viscosity variation with respect to the concentration variation at the kth concentration becomes "0", namely dV/dD(tan θ)=0. At this point, the viscosity exhibits the minimum value (Vmin). Thereafter, a region starts again in which the viscosity proportionally increases with an increase in the concentration, namely tan θ becomes plus.

With reference to FIG. 1, a pattern is described in which during concentrating process from 0.1 to 20 percent by weight, the maximum viscosity value (Vmax) emerges at one point, while the minimum viscosity value (Vmin) emerges at one point. However, employed as the viscosity retarding agents according to the present invention may be compounds which exhibit at least one characteristic which passes the region in which dV/dD=tan θ becomes negative. For example, employed may be compounds which exhibit characteristics in which at least two maximum viscosity values (Vmax) exist or in which there is no minimum viscosity value (Vmin) in the 1-20 percent by weight of the concentrating region.

The viscosity retarding agents according to the present invention are specifically amphiphiles, and belong to some of the materials in which hydrophilicity and hydrophobicity reverse. In water abundant environments, the above materials are combined with water via a hydrogen bond, while in water deficient environments, materials are mutually combined via a hydrogen bond, whereby the resulting viscosity decreases.

Such amphiphiles are compounds selected from those consisting of N-substituted type polyacrylamides such as poly-isopropylacrylamide, Pullulan which is subjected to hydrophobicity, modified polyethylene oxide, amphiphilic star polymers described in JP-A No. 2002-146256, and modified polyvinyl compounds or modified polyvinyl ether compounds described in JP-A Nos. 11-322866, 11-322942, 2000-319473, and 2001-19770. These may be in the form of either straight chain polymers or star polymer emulsions incorporating a polymer nucleus.

Of these, specifically preferred as monomers are N-substituted acrylamide compounds or vinyl ether compounds. Listed as specific compounds are, for example, N-substituted (meth)acrylamide derivatives and vinyl methyl ether derivatives. Of these, monomers which are preferred to achieve the effects of the present invention include N-substituted (meth) acrylamide derivatives in which N-ethylmethaacrylamide, N-n-propylacrylamide, N-isopropylacrylamide, N-isopropylmethacrylamide, N-cyclopropylacrylamide, N-cyclopropylmethacrylamide, N,N-diethylmethacrylamide, N-methyl-N-isopropylacrylamide, and N-methyl-N-n-propylacrylamide.

In the present invention, it is more preferable that amphiphiles have a core/shell structure. Examples include fine polymer particles having a core/shell structure which is composed of a core composed of (meth)acryl based polymers and a shell composed of N-alkylacrylamide polymers, described, for example, in JP-A Nos. 7-331224 and 2003-40916.

The average particle diameter of the viscosity retarding agents according to the present invention is preferably 10-300 nm. When the average particle diameter is at least 10 nm, it is possible to delay an increase in viscosity due to ink drying, while when it is at most 500 nm, it is possible to achieve stable ejection from recording heads without clogging. Consequently, the above range is preferred. It is possible to determine the average particle diameter of viscosity retarding agents employing commercially available particle size measurement instruments, employing a light scattering method, an electrophoretic method, or a laser Doppler method.

Further, in the ink-jet ink of the present invention, in view of further exhibiting the intended effects, the content of the viscosity retarding agents according to the present invention is preferably 0.2-30 percent by weight.

Further, the ink-jet ink of the present invention exhibits viscosity behavior with respect to the volume variation specified in aforesaid Formula (1).

Namely, in the ink-jet ink of the present invention, when $\eta_1$ represents ink viscosity at 25° C. and $\eta_2$ represents ink viscosity at 25° C. when water equivalent to 10 percent by weight of the total ink weight has been evaporated, it is characterized that ink viscosity ratio $\eta_2/\eta_1$ is in the range of $0.8 < \eta_2/\eta_1 < 5.0$, however more preferred range is $0.8 < \eta_2/\eta_1 < 2.5$.

Usually, the ink ejection amount from a recording head increase as the viscosity decreases. Accompanying the above, printing density increases. On the contrary, when ink viscosity increases, the resulting ejection amount decreases, whereby printing density decreases. Due to that, when ink viscosity ratio $\eta_2/\eta_1$ reaches less than 0.8 while water equivalent to 10 percent by weight of the total ink weight has been evaporated, viscosity difference from standard ink viscosity ($\eta_1$) becomes excessively large and the dot density of the image portion prepared by continuous ejection differs from that prepared by re-ejection from the ejection-terminated recording head, whereby image reproduction problems result. Further, in cases in which the viscosity exceeds 5.0 due to drying, it becomes difficult to perform stable ejection of ink droplets from the recording head due to excessively high viscosity caused by ink drying.

A method to determine $\eta_2/\eta_1$ specified by above Formula (1) is as follows. After determining the viscosity ($\eta_1$) and weight of ink at 25° C., evaporation components (such as water) of the ink are removed at 30° C. and a fan air amount of 1,000 rpm, employing FINE OVEN DF42, produced by Yamato Kagaku Co. When the weight of the ink equivalent to 10 percent by weight decreases, the above operation is terminated and the resulting ink viscosity ($\eta_2$) is determined, whereby $\eta_2/\eta_1$ is obtained.

Means to control above ink viscosity ratio $\eta_2/\eta_1$ within the range specified by the present invention are not particularly limited, but in the present invention, it is preferable to add the aforesaid viscosity retarding agents.

Fine polymer particles according to the present invention will now be described.

Fine polymer particles usable in the present invention are not particularly limited, and examples include styrene-butadiene copolymers, polystyrene, acrylonitrile-butadiene copolymers, acrylic acid ester copolymers, polyurethane, silicone-acryl copolymers, and acryl-modified fluororesins. Methacrylic acid-methacrylate copolymers are more preferable. The above fine polymer particles are used in the state of latexes. The latexes may be those which are prepared by dispersing polymer particles employing emulsifiers, or dispersing the same without emulsifiers. Commonly employed as emulsifiers are surface active agents. However, it is also preferable to employ polymers having a water-solubilizing group such as a sulfonic acid group or a carboxylic acid group (for example, polymers in which the solubilizing group has been subjected to graft bonding and polymers prepared employing monomers having a solubilizing group and monomers having insoluble portions).

Further, it is particularly preferable to employ soap-free latexes in the ink-jet ink of the present invention. As used herein, "soap-free latexes" refer to latexes which are prepared without the use of emulsifiers but are prepared by employing polymers (for example, polymers in which a solubilizing group is subjected to graft bonding and polymers prepared by employing monomers having a water-solubilizing group and monomers having insoluble portions as a emulsifier.

In recent years, as latex polymer particles, other than latexes in which polymer particles, in which entire particles are uniform, are dispersed, there are latexes in which core/shell type polymer particles, in which the composition of the central portion differs from that of the shell portion, are dispersed. It is possible to preferably use such type latexes.

In the ink-jet ink of the present invention, the average diameter of fine polymer particles is preferably 10-300 nm, while in view of ink stability and ejection stability, it is more preferably 10-200 nm. When the average diameter of the fine polymer particles is at most 300 nm, it is possible to achieve the desired feel of glossiness of formed images, while when it is at least 10 nm, it is possible to realize desired water resistance and abrasion resistance. It is possible to determine the average diameter of fine polymer particles employing commercially available particle size measurement instruments employing a light scattering method, an electrophoretic method or a laser Doppler method.

Further, in the ink-jet ink of the present invention, in view of further exhibiting targeted effects of the present invention, the content of the fine polymer particles according to the present invention is preferably 5-30 percent by weight. When the content of the fine polymer particles according to the present invention is at least 5 percent by weight, it is possible to achieve sufficient abrasion resistance, while when it is at most 30 percent by weight, the resulting ink viscosity is controlled within a suitable range, whereby it is possible to realize stable ink ejection.

The glass transition point of the fine polymer particles according to the present invention is preferably −20 to 80° C., but is more preferably −10 to 60° C. As the glass transition point drops, abrasion resistance is enhanced. However, when images face each other over a period of time, adhesion occurs to result in peeling of image portions. Further, when the glass transition point is excessively high, abrasion resistance is degraded.

The fine polymer particles according to the present invention are ejected onto a recording medium. Subsequently, water and organic solvents are removed to some extent to the exterior of the system due to drying and penetration, resulting in layer formation which effects fixation of pigments.

Pigments will now be described.

Employed as pigments usable in the present invention may be conventional organic or inorganic pigments known in the art. Examples include azo pigments such as azo lakes, insoluble azo pigments, condensed azo pigments, or chelate azo pigments; polycyclic pigments such as phthalocyanine pigments, perylene and perylene pigments, antharaquinone pigments, quinacridone pigments, dioxazine pigments, thioindigo pigments, iso-indolinone pigments, or quinophtahrony pigments; dye lakes such as basic dye type lakes or acidic dye type lakes; organic pigments such as nitro pigments, nitroso pigments, aniline black, or daylight fluorescent pigments, and inorganic pigments such as carbon black.

Specific organic pigments are exemplified below.

Listed as pigments for magenta or red are C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. and Pigment Red 222.

Listed as pigments for orange or yellow are C.I. are Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, and C.I. Pigment Yellow 138.

Listed as pigments for green or cyan are C.I. Pigment Blue 15, C.I. Pigment Blue 15:2, C.I. Pigment Blue 15:3, C.I. Pigment Blue 16, C.I. Pigment Blue 60, and C.I. Pigment Green 7.

Listed as methods for dispersing pigments are those employing various homogenizers such as a ball mill, a sand mill, an attritor, a roller mill, an agitator, a Henschel mixer, a colloid mill, an ultrasonic homogenizer, a pearl mill, a wet system jet mill, or a paint shaker. Further, it is preferable to employ centrifuges and filters to remove the coarse particles in a pigment dispersion.

In the ink according to the present invention, preferred are self-dispersible pigments which are subjected to pendant of a polar group such as a sulfonic acid or carboxylic acid on the surface of pigments particles, or pigments which are subjected to dispersion employing polymer dispersing agents.

Polymer dispersing agents according to the present invention are not particularly limited, and water-soluble or water-insoluble resins are employed. Listed as these polymers may, for example, be homopolymers composed of one kind monomer selected from the group consisting of styrene, styrene derivatives, vinylnaphthalene derivatives, acrylic acid, acrylic acid derivatives, methacrylic acid, methacrylic acid derivatives, maleic acid, maleic acid derivatives, itaconic acid, itaconic acid derivatives, fumaric acid and fumaric acid derivatives, and copolymers composed of at least two kinds of monomers, as well as salts thereof. It is possible to employ water-soluble polymers such as polyvinyl alcohol, polyvinylpyrrolidone, cellulose derivatives, gelatin, or polyethylene glycol.

The content of these water-soluble resins is preferably 0.1-10 percent by weight with respect to the total ink, but is more preferably 0.3-5 percent by weight. Further, these water-soluble resins may be employed in combination of at least two types.

The content of pigments used in the ink-jet ink of the present invention is preferably 0.3-20 percent by weight with respect to the total ink weight, but is more preferably 2.0-15 percent by weight.

The ink-jet ink of the present invention incorporates at least water as a solvent, but it is possible to further employ water-soluble organic solvents.

Listed as preferably employed water-soluble organic solvents are, for example, alcohols (e.g., methanol, ethanol, propanol, n-butanol, isobutanol, secondary butanol, and tertiary butanol; polyhydric alcohols (e.g., ethylene glycol, diethylene glycol, triethylene glycol, polyethylene glycol, propylene glycol, dipropylene glycol, polypropylene glycol, butylenes glycol, hexanediol, pentanediol, glycerin, hexanetriol, and thioglycol); polyhydric ethers (e.g., ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether); amines (e.g., ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamthyldiethylenetriamine, and tetramethylpropylenediamine); amides (e.g., formamide, N,N-dimethylformamide, and N,N-dimethylacetamide); heterocycles (e.g., 2-pyrrolidone, N-methyl-2-pyrrolidone, cyclohexylpyrrolidone, 2-oxazolidone, and 3-dimethyl-2-imidazolidinone); and sulfoxides (e.g., dimethylsulfoxide).

In view of controlling the surface tension of ink or enhancing the dispersion stability of pigments, it is possible to incorporate, into the ink-jet ink of the present invention, various surface active agents.

The ratio water:water-soluble organic solvents is preferably 95:5 to 50:50, more preferably 95:5 to 60:40.

Surface active agents usable in the present invention are not particularly limited, listed examples being anionic surface active agents such as dialkylsulfosuccinic acid salts, alkylnaphthalenesulfonic acid salts, or fatty acid salts; nonionic surface active agents such as polyoxyethylene alkyl ethers, polyoxyethylene alkyl allyl ethers, acetylene glycols, or polyoxyethylene-polyoxypropylene block copolymers; and cationic surface active agents such as alkylamines or quaternary ammonium salts. Of these, particularly preferably employed are anionic and nonionic surface active agents.

Further, in the present invention, it is also possible to employ polymer surface active agents. Listed as such examples may be styrene-acrylic acid-acrylic acid ester copolymers, styrene-acrylic acid copolymers, styrene-maleic acid-acrylic acid alkyl ester copolymers, styrene-maleic acid copolymers, styrene-methacrylic acid-acrylic acid alkyl ester copolymers, styrene-methacrylic acid copolymers, styrene-maleic acid-phenyl ester copolymers, vinylnaphthalene-acrylic acid copolymers, and vinylnaphthalene-maleic acid copolymers.

Other than those described above, corresponding to the purpose to enhance various types of performance such as ejection stability, adaptability for printing heads and ink cartridges, storage stability, or image retention properties, if desired, it is possible to incorporate, into the ink-jet ink of the present invention, various additives known in the art such as viscosity modifiers, specific resistance controlling agents, film forming agents, UV absorbers, antioxidants, anti-discoloring agents, fungicides, or anticorrosive agents. Listed as examples may be liquid minute oil droplets composed of paraffin, dioctyl phthalate, tricresyl phosphate, or silicone oil; UV absorbers described in JP-A Nos. 57-74193, 57-87988, and 62-261476; anti-discoloring agents described in JP-A Nos. 57-74192, 57-87989, 60-72785, 61-146591, 1-95091, and 3-13376; and optical brightening agents described in JP-A Nos. 59-42993, 59-52689, 62-280069, 61-242871, and 4-219266.

The viscosity of the ink-jet ink of the present invention, which is constituted as above, is preferably 10-300 mPa·s at 25° C., but is more preferably 10-200 mPa·s. By controlling the ink viscosity to at least 10 mPa·s, preferred fluidity is achieved during image recording, whereby it is possible to realize high image sharpness. Further, by controlling viscosity to at most 300 mPa·s, suitable ink viscosity is achieved, enabling stable ejection from recording heads.

The recording method of the present invention will now be described.

In the recording method employing the ink-jet ink of the present invention, ink-jet recording images are formed in such a manner that the ink is ejected in the form of droplets from ink-jet heads based on digital signals employing a printer loaded with the ink-jet ink and deposited onto the recording medium.

Ink-jet recording heads usable in the recording method employing the ink-jet ink of the present invention may use either an on-demand system or a continuous system. Further, employed as an ink ejection system may be any of the following systems such as an electrical-mechanical conversion system (such as a single cavity type, a double cavity type, a vendor type, a piston type, a shared mode type, or a shared wall type), an electrical-thermal conversion system (such as a thermal ink-jet type, or BUBBLE JET (a registered trade name) type).

In the recording method of the present invention, in view of fully exhibiting the targeted effects of the present invention, it is preferable that the amount of ink ejected from the above ink-jet recording heads is controlled to be 0.1-2.0 pl per droplet.

Widely employed as recording media usable in the recording method employing the ink-jet ink of the present invention may, as an example, be plain paper, coated paper, cast-coated paper, glossy paper, glossy film, OHP film, and exclusive ink-jet paper. Of these, it is possible to exhibit the targeted effects via ink-jet image recording employing plain paper, coated paper, cast-coated paper, or glossy paper, any of which is an absorptive support.

Paper includes coated paper and non-coated paper. Coated paper includes art paper in which the coated amount on one side is approximately 20 g/m$^2$, coated paper in which the coated amount on one side is approximately 10 g/m$^2$, light weight coated paper in which the coated amount on one side is approximately 5 g/m$^2$, ultra light weight coated paper, matte finished coated paper, double tone finished double coated paper, and newsprint paper. Non-coated paper includes printing paper A employing 100 percent chemical pulp, printing paper B employing at least 70 percent chemical pulp, printing paper C employing from 40 to 70 percent chemical pulp, printing paper D employing at most 40 percent chemical pulp, and gravure paper which incorporates mechanical pulp and has been subjected to calendering. More detailed reference will be made to "Saishin Kamikako Binran (Handbbok of Recent Paper Treatments)", edited by Kako Binran Henshuiinkai Hen, published by Tech Times and "Insatsu Kogaku Binran (Printing Engineering. Handbook)", edited by Nihon Insatsu Gakkai.

Employed as plain paper, are 80-200 μm thick non-coated paper which belongs to a part of non-coated paper sheets, special printing paper sheets, and information sheets. Examples include high quality printing paper, medium quality printing paper, and low quality printing paper, thin printing paper, ultra-thin printing paper, or special printing paper such as high quality colored paper, form paper sheets, PCP sheets, and other kinds such as information sheets. Specifically, available are the paper sheets described below and various modified/treated paper sheets, but the present invention is not limited thereto. Listed are HIGH QUALITY PAPER, HIGH QUALITY COLORED PAPER, RECYCLED PAPER, COPYING PAPER/COLOR, OCR PAPER, NON-CARBON PAPER/SYNTHETIC PAPER such as UPO 60, 80, and 110 MICRON, or UPOCOAT 70 and 90 MICRON, others such as ONE SIDE ART PAPER 68 kg, COATED PAPER 90 kg, MATTE FORM PAPER 70, 90, and 110 kg, FOAMED PET 38 micron, and MITSUORIKUN (all available from Kobayashi Kirokushi Co., Ltd.), OK HIGH QUALITY PAPER, NEW OK HIGH QUALITY PAPER, SUN FLOWER, PHOENIX, OK ROYAL WHITE, HIGH QUALITY EXPORT PAPER (NPP, NCP, NWP, and ROYAL WHITE), OK BOOK PAPER, OK CREAM BOOK PAPER, CREAM HIGH QUALITY PAPER, OK MAP PAPER, OK ISHIKARI, KYUUREI, OK FORM, OKH, and NIP-N (all available from Shin-Oji Paper Co., Ltd.); KINO, TOKO, EXPORT HIGH QUALITY PAPER, SPECIAL DEMAND HIGH QUALITY PAPER, BOOK PAPER, BOOK PAPER L, PALE CREAM BOOK PAPER, PRIMARY SCHOOL SCIENCE TEXT BOOK PAPER, CONTINUOUS SLIP PAPER, HIGH QUALITY NIP PAPER, GINKAN, KINYO, KINYO (W), BRIDGE, CAPITAL, GINKAN BOOK PAPER, HARP, HARP CREAM, SK COLOR, SECURITY PAPER, OPERA CREAM, OPERA, KYP CARTE, SYLVIA HN, EXCELLENT FORM, and NPI FORM DX (all available from Nippon Paper Co., Ltd.); PEARL, KINRYO, PALE CREAM HIGH QUALITY PAPER, SPECIAL BOOK PAPER, SUPER BOOK PAPER, DIAFORM, and INK JET FORM (all available from Mitsubishi Paper Mills Ltd.); KINMO V, KINMO SW, HAKUZO, HIGH QUALITY PUBLISHING PAPER, CREAM KINMO, CREAM HAKUZO, SECURITY/TRADABLE COUPON PAPER, BOOK PAPER, MAP PAPER, COPY PAPER, and HNF (all available from Hokuetsu Paper Mills, Ltd.); SIORAI, TELEPHONE DIRECTORY COVER, BOOK PAPER, CREAM SHIORAI, CREAM SHIORAI MEDIUM ROUGH, CREAM SHIORAI HIGH ROUGH, and DSK (all available from Daishowa Paper Manufacturing Co., Ltd.); SENDAI MP HIGH QUALITY PAPER, KINKO, RAICHO HIGH QUALITY, HANGING PAPER, COLORED PAPER BASE PAPER, DICTIONARY PAPER, CREAM BOOK, WHITE BOOK, CREAM HIGH QUALITY PAPER, MAP PAPER, and CONTINUOUS SLIP PAPER (Chuetsu Paper & Pulp Co., Ltd.); OP KINO (CHUETSU), KINSA, REFERENCE PAPER, TRADABLE COUPON PAPER (WHITE)), FORM PRINTING PAPER, KRF, WHITE FORM, COLOR FORM, (K)NIP, FINE PPC, and KISHU INK-JET PAPER (all produced by Kishu Paper Co., Ltd.); TAIOU, BRIGHT FORM, KANT, KANT WHITE, DANTE, CM PAPER, DANTE COMIC, HEINE, PAPER BACKS PAPER, HEINE S, NEW AD PAPER, UTRILLO EXCEL, EXCEL SUPER A, KANTO EXCEL, EXCEL SUPER B, DANTE EXCEL, HEINE EXCEL, EXCEL SUPER C, EXCEL SUPER D, AD EXCEL, EXCEL SUPER E, NEW BRIGHT FORM, and NEW BRIGHT NIP (all available from Daio Paper Corporation); NICHIRIN, GETSURIN, UNREI, GINGA, HAKUUN, WAISU, GETURIN ACE, HAKUUN ACE, and UNKIN ACE (all produced by Japan Paper Industry Co., Ltd.); TAIOU, BRIGHT FORM and BRIGHT NIP (all avaialbew from Nagoya Pulp Co., Ltd.); BOTAN A, KINBATO, TOKU BOTAN, SHIROBOTAN A, SHIROBOTAN C, GINBATO, SUPER SHIROBOTAN A, PALE CREAM SHIROBOTAN, SPECIAL MEDIUM QUALITY PAPER, SHIROBATO, SUPER MEDIUM QUALITY PAPER, AO BATO, AKA BATO, KIN BATO M SNOW VISION, KIN BATO SNOW VISION, SHIRO BATO M, SUPER DX, HANAMASU O, AKA BATO M, and HK SUPER PRINTING PAPER (all manufactured by Honshu Paper Co., Ltd.); STAR LINDEN (A.AW), STAR ELM, STAR MAPLE, STAR LAU- REL; STAR POPLAR, MOP, STAR CHERRY I, CHERRY I SUPER, CHERRY II SUPER, STAR CHERRY III, STAR CHERRY IV, CHERRY III SUPER, and CHERRY IV SUPER (all produced by Marusumi Paper Co., Ltd.); SHF (produced by Toyo Pulp Co., Ltd.); and TRP (produced by Tokai Pulp Co., Ltd.).

EXAMPLES

The present invention will now be specifically described with reference to examples, however, the present invention is not limited thereto. Incidentally, "%" and "parts" in the examples below are "% by weight" and "parts by weight", respectively, unless otherwise specified.

Example 1

<<Preparation of Viscosity Retarding Agents>>

(Preparation of Viscosity Retarding Material 1)

Monomer Liquid Composition 1 was prepared by blending 14 parts of styrene, 6 parts of butyl acrylate, 10 parts of 2-hydroethyl acrylate, and 0.5 part of ethylene glycol dimethacrylate.

Charged into a four-necked flask were 0.2 part of dodecyl sulfate and 180 parts of ion-exchanged water. After dissolution, air in the flask was replaced with nitrogen. Added into the resulting solution were 5 parts of Monomer Liquid Composition 1, and the resulting mixture was heated to 60° C. while stirring. After the temperatures rise, 3 parts of 2% aqueous ammonium persulfate solution were dripped and thereafter, the resulting mixture was heated to 80° C. and residual Monomer Liquids Composition 1 (25.5 parts) and 40 parts of a 2% aqueous ammonium persulfate solution were dripped over three hours. The resulting mixture was then subjected to ripening for two hours, whereby a core portion was prepared.

While maintaining the above reaction liquid composition at 80° C., a mixture of 100 parts of N-isopropylacrylamide and 1,000 parts of ion-exchanged water, as well as 240 parts of 0.2 percent of ammonium persulfate were dripped over two hours, and the resulting mixture was subjected to ripening four hours. Thereafter, coarse particles were removed via centrifugal separation, whereby an aqueous dispersion incorporating Viscosity Retarding Material 1 exhibiting a core/shell structure at an average particle diameter of 148 nm was obtained. Incidentally, the average particle diameter was determined employing ZETA SIZER 1000HS, produced by Malvern Co.

By employing resulting Viscosity Retarding Material 1, 0.1% aqueous dispersion was prepared and concentrated to 20%. During concentration, viscosity at 25° C. was determined, and a viscosity (V)—concentration (D) curve was prepared. The results showed that as the concentration was increased from 0.1%, the viscosity increased; at the point of 2.0%, the viscosity reached its maximum value (Vmax); thereafter, in the region of 2.2% -5.0%, dV/dD became minus; at the point of 5.2%, the viscosity reached its minimum value (Vmin); and after 5.4%, the viscosity again increased.

(Preparation of Viscosity Retarding Material 2)

An aqueous dispersion incorporating Viscosity Retarding Material 2, exhibiting a core/shell structure at an average particle diameter of 330 nm, was prepared in the same manner as above Viscosity Retarding Material 1, except that 0.2 part of the dodecyl sulfate was replaced with 0.2 part of $C_{12}H_{25}O(CH_2CH_2O)_9H$.

By employing resulting Viscosity Retarding Material 2, 0.1% aqueous dispersion was prepared and concentrated to 20%. During concentration, viscosity at 25° C. was determined, and a viscosity (V)—concentration (D) curve was prepared. The results showed that as the concentration was increased from 0.1%, the viscosity increased; at the point of 1.8%, the viscosity reached its maximum value (Vmax); thereafter, in the region of 2.0% -5.0%, dV/dD became minus, at the point of 5.0%, the viscosity reached its minimum value (Vmin); and after 5.2%, the viscosity again increased.

(Preparation of Viscosity Retarding Material 3)

An aqueous dispersion incorporating Viscosity Retarding Material 3 exhibiting a core/shell structure at an average particle diameter of 118 nm was prepared in the same manner as above Viscosity Retarding Material 1, except that N-isopropylacrylamide was replaced with N-ethylacrylamide.

By employing resulting Viscosity Retarding Material 1, a 0.1% aqueous dispersion was prepared and concentrated to 20%. During concentration, viscosity at 25° C. was determined, and a viscosity (V)—concentration (D) curve was prepared. The results showed that as the concentration was increased from 0.1%, the viscosity also increased; at the point of 2.8%, the viscosity reached its maximum value (Vmax); thereafter, in the region of 3.0% -7.0%, dV/dD became minus; at the point of 7.2%, the viscosity reached its minimum value (Vmin); and after 7.4%, the viscosity again increased.

(Preparation of Viscosity Retarding Material 4)

An aqueous dispersion incorporating Viscosity Retarding Material 4 exhibiting a core/shell structure at an average particle diameter of 125 nm was prepared in the same manner as above Viscosity Retarding Material 1, except that N-isopropylacrylamide was replaced with N-acryloylpiperidine.

By employing resulting Viscosity Retarding Material 4, 0.1% aqueous dispersion was prepared and concentrated to 20%. During concentration, viscosity at 25° C. was determined, and a viscosity (V)—concentration (D) curve was prepared. The results showed that as the concentration was increased from 0.1%, the viscosity increased; at the point of 2.8%, the viscosity reached its maximum value (Vmax); thereafter, in the region of 2.2% -5.0%, dV/dD became minus; at the point of 5.2%, the viscosity reached its minimum value (Vmin); and after 5.4%, the viscosity again increased.

(Preparation of Viscosity Retarding Material 5)

An aqueous dispersion incorporating Viscosity Retarding Material 5 exhibiting a core/shell structure at an average particle diameter of 223 nm was prepared in the same manner as above Viscosity Retarding Material 1, except that N-isopropylacrylamide was replaced with 2-ethoxyethyl vinyl ether.

By employing resulting Viscosity Retarding Material 5, 0.1% aqueous dispersion was prepared and concentrated to 20%. During concentration, viscosity at 25° C. was determined, and a viscosity (V)—concentration (D) curve was prepared. The results showed that as the concentration was increased from 0.1%, the viscosity increased; at the point of 2.8%, the viscosity reached its maximum value (Vmax); thereafter, in the region of 3.0% -5.0%, dV/dD became minus; at the point of 5.2%, the viscosity reached its minimum value (Vmin); and after 5.4%, the viscosity again increased.

(Preparation of Viscosity Retarding Material 6)

Monomer Liquid Composition 2 was prepared by blending 14 parts of styrene, 6 parts of n-butyl acrylate, 10 parts of 2-hydroxyethyl acrylate, 0.5 part of ethylene glycol dimethacrylate, and 100 parts of N-isopropylacrylamide.

Charged into a four-necked flask were 0.2 part of dodecyl sulfate and 1,180 parts of ion-exchanged water. After dissolution, air in the flask was replaced with nitrogen. Added into the resulting solution were 5 parts of Monomer Liquid Composition 2, and the resulting mixture was heated to 60° C. while stirring. After the temperatures rise, 43 parts of a 2% aqueous ammonium persulfate solution were dripped and thereafter, the resulting mixture was heated to 80° C. and residual Monomer Liquids Composition 2 and 40 parts of the 2% aqueous ammonium persulfate solution were dripped over 4 hours. The resulting mixture was then subjected to ripening for two hours, whereby an aqueous dispersion incorporating Viscosity Retarding Material 6 at an average particle diameter was obtained.

By employing resulting Viscosity Retarding Material 6, 0.1% aqueous dispersion was prepared and concentrated to 20%. During concentration, viscosity at 25°C. was determined, and a viscosity (V)—concentration (D) curve was prepared. The results showed that as the concentration was increased from 0.1%, the viscosity also increased; at the point of 1.8%, the viscosity reached its maximum value (Vmax); thereafter, in the region of 2.0-5.0%, dV/dD became minus; at the point of 5.2%, the viscosity reached its minimum value (Vmin); and after 5.4%, the viscosity again increased.

(Preparation of Viscosity Retarding Material 7)

Monomer Liquid Composition 3 was prepared by blending 5 parts of styrene, 10 parts of 2-hydroethyl acrylate, 10 parts of methacrylic acid, and 100 parts of N-isopropylacrylamide.

Charged into a four-necked flask were 0.2 part of dodecyl sulfate and 1,180 parts of ion-exchanged water. After dissolution, air in the flask was replaced with nitrogen. Added into the resulting solution were 5 parts of Monomer Liquid Composition 5, and the resulting mixture was heated to 60° C. while stirring. After the temperatures rise, 43 parts of a 2% aqueous ammonium persulfate solution were dripped and thereafter, the resulting mixture was heated to 80° C. and residual Monomer Liquid Composition 3 and 40 parts of the 2% aqueous ammonium persulfate solution were dripped over 4 hours. The resulting mixture was then subjected to ripening for two hours, and subsequently neutralized by the addition of N,N-dimethylethanolamine, whereby an aqueous solution was prepared in which Viscosity Retarding Material 7 was in a dissolved state.

By employing resulting Viscosity Retarding Material 6, 0.1% aqueous dispersion was prepared and concentrated to 20%. During concentration, viscosity at 25° C. was determined, and a viscosity (V)—concentration (D) curve was prepared. The results showed that as the concentration was increased from 0.1%, the viscosity also increased; at the point of 1.8%, the viscosity reached its maximum value (Vmax); thereafter, in the region of 2.0-5.0%, dV/dD became minus; at the point of 5.2%, the viscosity reached its minimum value (Vmin); and after 5.4%, the viscosity again increased.

<<Preparation of Ink-jet Inks>>
(Carbon Black Dispersion)

| | |
|---|---|
| TOKA BLACK #8500 (produced by Tokai Carbon Co., Ltd.) | 120 g |
| JOHNCRYL 62 (produced by Johnson Polymer Co., Ltd.) | 59 g |
| LEVENOL WX (produced by KAO Corp.) | 3 g |
| Diethylene glycol | 100 g |
| Ion-exchanged water | 300 g |

After blending all the above components, the resulting mixture was dispersed employing a sand grinder filled to 50% in terms of volume ratio with 0.5 mm zirconia beads, and subsequently coarse materials were removed by a centrifuge, whereby a black pigment dispersion was prepared.

(Preparation of Black Inks 1-22)

| | |
|---|---|
| Carbon black dispersion | 10 parts of solids |
| Viscosity retarding agent (the type described in Table 1) | parts described in Table 1 (parts as solids) |
| Ethylene glycol | 10 parts |
| Fine polymer particles (the type described in Table 1) | parts described in Table 1 (parts as solids) |
| OLFIN E1010 (produced by Nissin Chemical Industry Co., Ltd. Co., Ltd.) | 0.3 part |
| PROXEL GXL (produced by Avicia Co.) | 0.1 part |
| Water to make | 100 parts |

(Determination of Ink Viscosity)

Viscosity of each of the black inks prepared as above was determined at 25° C. employing B TYPE VISCOSIMETER BL produced by Tokyo Keiki Co., Ltd. Table 1 shows the results.

Comparative additives and fine polymer particles listed in Table 1, employing abbreviation are detailed below.

(Comparative Additives)

A: hydroxypropyl cellulose (HPC-M resulting in no viscosity maximum, produced by Nippon Soda Co., Ltd.)

B: polyethylene glycol (at an average molecular weight of 10,000, resulting in no viscosity maximum)

(Fine Polymer Particles)

LxA: composition of St/BA/2EHA/MAA at an average molecular weight of 55,000, an average particle diameter of 105 nm, and a Tg of 15° C.

LxB: composition of St/BA/2EHA/MAA at an average molecule weight of 50,000, an average particle diameter of 250 nm, and a Tg of 15° C.

LxC: composition of St/BA/2EHA/MAA at an average molecular weight of 55,000, an average particle diameter of 350 nm, and a Tg of 15° C.

LxD: composition of St/BMA/EHMA/MAA at an average molecular weight of 30,000, an average particle diameter of 87 nm, and a Tg of 45° C.

LxE: composition of St/2EHA/HEMA/MAA at an average molecular weight of 100,000, an average particle diameter of 120 nm, and a Tg of 30° C.

LxF: composition of St/2EHA/HEMA/MAA at an average molecular weight of 100,000, an average particle diameter of 120 nm, and a Tg of 30° C.

LxF: composition of St/BMA/HEMA/MAA at an average molecular weight of 120,000, an average particle diameter of 156 nm, and a Tg of 50° C.

St: styrene
2EHA: 2-ethylhexyl acrylate
HEMA: 2-hydroxyehyl acrylate
MAA: methacrylic acid
BA: n-butyl acrylate
BMA: n-butyl methacrylate <<Evaluation of Ink-Jet Inks>>

(Determination of Ink Viscosity Ratio $\eta_2/\eta_1$)

Viscosity ($\eta_1$) of each of the inks prepared as above was determined at 25° C. employing B TYPE VISCOSIMETER BL produced by Tokyo Keiki Co., Ltd. Subsequently, each ink was placed in FINE OVEN DF42, produced by Yamato Scientific Co., Ltd., and evaporable components (such as water) were removed at 30° C. and a fan air amount of 1,000 rpm. When the ink weight was reduced by 10 percent by weight, the above operation was terminated and ink viscosity ($\eta_2$) was determined employing the above viscometer, whereby $\eta_2/\eta_1$ was determined.

(Formation of Ink-Jet Images)

Each of the black inks prepared as above was ejected onto an art paper (TOKUBISHI ART at a base weight of 127.9 g/m², produced by Mitsubishi Paper Mills Ltd.) at an ejection amount of 0.5 pl per droplet, employing INK JET PRINTER PXG-900, produced by Seiko Epson Corp., or the ink-jet printer fitted with electrostatic suction type ink-jet recording heads described in JP-A No. 2004-136656, whereby line images as well as solid images were printed.

(Evaluation)

(Evaluation of Ejection Stability)

Under the above ink-jet image forming conditions, a line image and a solid image which were arranged to result in some space between them, were continuously printed on nine art paper sheets at 40° C. and 30% relative humidity or 20° C. and 70% relative humidity. A 10th sheet was printed 10 minutes after the termination of the above printing. During printing of the 10th sheet, the ejection state of the nozzle was visually observed and ejection stability was evaluated based on the criteria below.
A: no change of the ejection state of any nozzle was noted
B: declined ejection was noted in 1-2 percent of nozzles, but no lack of ink ejection was noted
C: lack of ink ejection was noted in 3-10 percent of nozzles
D: lack of ink ejection was noted in at least 10 percent of nozzles (Evaluation of Abrasion Resistance)

The surface of each of the solid black images prepared as above was subjected to reciprocating abrasion of five times employing an office eraser (MONO produced by Tombow Pencil Co., Ltd.), and the residual density was visually evaluated by 20 people, based on the criteria below.
A: at least 16 people noted that most of the original image density remained
B: 12-15 people noted that most of the original image density remained
C: 8-11 people noted that most of the original image density remained
D: at most 7 people noted that most of the original image density remained (Evaluation of Image Smoothness)

The surface of each of the printed images was visually observed and the image smoothness was evaluated based on the criteria below.
A: no raised image was noted, resulting in excellent smoothness
B: raised image was partly noted, resulting in negligible problems for commercial viability
C: raised image was noted, but within the commercially viable level
D: marked raised image was noted, resulting in problems of commercial viability due to degraded image quality
Table 1 shows the results.

TABLE 1

| Image No. | Ink No. | Viscosity Retarding Material | | Fine polymer particles | | | Ink Viscosity (mPa·s) |
|---|---|---|---|---|---|---|---|
| | | Type | Average Particle Diameter (nm) | Added amount (parts) | Type | Average Particle Diameter (nm) | Added amount (parts) | |
| 1 | 1 | 1 | 148 | 1.0 | A | 105 | 2.5 | 7 |
| 2 | 2 | 1 | 148 | 1.0 | A | 105 | 5.0 | 11 |
| 3 | 3 | 1 | 148 | 1.0 | A | 105 | 10.0 | 24 |
| 4 | 4 | 1 | 148 | 0.2 | A | 105 | 10.0 | 19 |
| 5 | 5 | 1 | 148 | 7.0 | A | 105 | 10.0 | 36 |
| 6 | 6 | 1 | 148 | 1.0 | B | 250 | 10.0 | 18 |
| 7 | 7 | 1 | 148 | 1.0 | C | 350 | 10.0 | 22 |
| 8 | 8 | 2 | 330 | 1.0 | A | 105 | 10.0 | 25 |
| 9 | 9 | 1 | 148 | 1.0 | D | 87 | 10.0 | 7 |
| 10 | 10 | 1 | 148 | 1.0 | E | 120 | 10.0 | 230 |
| 11 | 11 | 1 | 148 | 1.0 | F | 156 | 10.0 | 330 |
| 12 | 12 | 1 | 148 | 1.0 | A | 105 | 15.0 | 36 |
| 13 | 13 | 1 | 148 | 1.0 | A | 105 | 20.0 | 66 |
| 14 | 14 | 1 | 148 | 1.0 | A | 105 | 25.0 | 120 |
| 15 | 15 | 3 | 118 | 1.0 | A | 105 | 10.0 | 41 |
| 16 | 16 | 4 | 125 | 1.0 | A | 105 | 10.0 | 25 |
| 17 | 17 | 5 | 223 | 1.0 | A | 105 | 10.0 | 23 |
| 18 | 18 | 6 | 174 | 1.0 | A | 105 | 10.0 | 23 |
| 19 | 19 | 7 | — | 1.0 | A | 105 | 10.0 | 32 |
| 20 | 20 | — | — | — | A | 105 | 10.0 | 20 |
| 21 | 21 | A | — | 1.0 | A | 105 | 10.0 | 260 |
| 22 | 22 | B | — | 1.0 | A | 105 | 10.0 | 20 |

| Image No. | Ink No. | Viscosity Ratio $\eta_2/\eta_1$ | Droplet Volume during Ejection (pl) | Ejection Stability | | Abrasion Resistance | Image Smoothness | Remarks |
|---|---|---|---|---|---|---|---|---|
| | | | | 40° C., 30% RH | 20° C., 70% RH | | | |
| 1 | 1 | 2.0 | 0.5 | B | A | B | A | Inv. |
| 2 | 2 | 2.2 | 0.5 | A | A | A | A | Inv. |
| 3 | 3 | 2.4 | 0.5 | A | A | A | A | Inv. |
| 4 | 4 | 2.6 | 0.5 | A | A | A | A | Inv. |
| 5 | 5 | 3.0 | 0.5 | A | A | A | A | Inv. |

TABLE 1-continued

| | | | | | | | | | |
|---|---|---|---|---|---|---|---|---|---|
| 6 | 6 | 2.3 | 0.5 | A | A | A | A | Inv. | |
| 7 | 7 | 2.4 | 0.5 | B | B | B | B | Inv. | |
| 8 | 8 | 2.8 | 0.5 | B | B | B | B | Inv. | |
| 9 | 9 | 3.4 | 0.5 | A | A | A | B | Inv. | |
| 10 | 10 | 2.1 | 0.5 | A | A | A | A | Inv. | |
| 11 | 11 | 2.1 | 0.5 | A | A | A | A | Inv. | |
| 12 | 12 | 2.8 | 0.5 | A | A | A | A | Inv. | |
| 13 | 13 | 3.5 | 0.5 | A | A | A | A | Inv. | |
| 14 | 14 | 4.5 | 0.5 | A | A | A | A | Inv. | |
| 15 | 15 | 1.5 | 0.5 | A | A | A | A | Inv. | |
| 16 | 16 | 2.4 | 0.5 | A | A | A | A | Inv. | |
| 17 | 17 | 4.6 | 0.5 | B | A | A | A | Inv. | |
| 18 | 18 | 3.4 | 0.5 | B | B | B | B | Inv. | |
| 19 | 19 | 4.5 | 0.5 | B | B | B | B | Inv. | |
| 20 | 20 | 8.9 | 0.5 | D | D | B | D | Comp. | |
| 21 | 21 | 5.8 | 0.5 | D | C | B | B | Comp. | |
| 22 | 22 | 15.0 | 0.5 | D | D | A | B | Comp. | |

Inv.: Present Invention,
Comp.: Comparative Example

As can clearly be seen from the results of Table 1, when the viscosity retarding agent-containing inks of the present invention, in which ink viscosity ratio $\eta_2/\eta_1$ was in the range specified in the present invention, was intermittently ejected in conditions which differed in temperature and humidity, no poor ejection resulted compared to comparative examples, and abrasion resistance and smoothness of the resulting images were excellent.

Example 2

Each of Black Inks 3 and 20 prepared in Example 1 was ejected onto an art paper (TOKUBISHI ART at a base weight of 127.9 g/m², produced by. Mitsubishi Paper Mills Ltd.) at an ejection amount per droplet listed in Table 2, employing INK JET PRINTER PXG-900, produced by Seiko Epson Corp. or an ink-jet printer fitted with electrostatic suction type ink-jet recording heads described in JP-A No. 2004-136656, and line images as well as solid images were printed, and ejection stability, abrasion resistance and image smoothness were evaluated employing the same methods as those described in Example 1.

As can clearly be seen from the results of Table 2, by forming images at an ejection of 0.2-2.0 pl per droplet, more preferably ejection stability and image smoothness were achieved.

As described above, according to the present invention, it was possible to provide ink-jet ink which exhibited excellent ejection stability during printing and resulted in improved abrasion resistance of text and images formed on various recording media and improved image smoothness.

It is to be noted that various changes and modifications will be apparent to those skilled in the art. Therefore, unless such changes and modifications depart from the scope of the present invention, they should be construed as being included therein.

What is claimed is:

1. An ink-jet ink comprising a pigment, water, fine polymer particles and a viscosity retarding agent
    wherein the viscosity retarding agent is an amphiphilic polymer having a core/shell structure.

TABLE 2

| Image No. | Ink No. | Viscosity Retarding Material/Amphiphile | | | Fine polymer particles | | | Droplet Volume during Ejection (pl) | Ejection Stability | | Abrasion Resistance | Image Smoothness | Remarks |
|---|---|---|---|---|---|---|---|---|---|---|---|---|---|
| | | Type | Average Particle Diameter (nm) | Added amount (parts) | Type | Average Particle Diameter (nm) | Added amount (parts) | | 40° C., 30% RH | 20° C., 70% RH | | | |
| 23 | 3 | 1 | 148 | 1.0 | A | 105 | 10.0 | 0.2 | A | A | A | A | Inv. |
| 24 | 2 | 1 | 148 | 1.0 | A | 105 | 10.0 | 0.5 | A | A | A | A | Inv. |
| 25 | 3 | 1 | 148 | 1.0 | A | 105 | 10.0 | 1.0 | A | A | A | A | Inv. |
| 26 | 3 | 1 | 148 | 1.0 | A | 105 | 10.0 | 1.5 | A | A | A | A | Inv. |
| 27 | 3 | 1 | 148 | 1.0 | A | 105 | 10.0 | 2.0 | A | A | A | A | Inv. |
| 28 | 3 | 1 | 148 | 1.0 | A | 105 | 10.0 | 2.5 | B | A | B | B | Inv. |
| 29 | 3 | 1 | 148 | 1.0 | A | 105 | 10.0 | 3.0 | B | A | B | B | Inv. |
| 30 | 20 | — | — | — | A | 105 | 10.0 | 0.2 | D | D | B | D | Com. |
| 31 | 20 | — | — | — | A | 105 | 10.0 | 0.5 | D | D | B | D | Com. |
| 32 | 20 | — | — | — | A | 105 | 10.0 | 1.0 | D | D | C | D | Com. |
| 33 | 20 | — | — | — | A | 105 | 10.0 | 1.5 | D | D | C | D | Com. |
| 34 | 20 | — | — | — | A | 105 | 10.0 | 2.0 | D | D | C | D | Com. |
| 35 | 20 | — | — | — | A | 105 | 10.0 | 2.5 | D | D | C | D | Com. |
| 36 | 20 | — | — | — | A | 105 | 10.0 | 3.0 | D | D | D | D | Com. |

Inv.: Present Invention,
Comp.: Comparative Example

2. The ink-jet ink of claim 1, wherein ink viscosity ratio $\eta_2/\eta_1$ of the ink satisfies the condition specified by following Formula (1):

$$0.8 < \eta_2/\eta_1 < 5.0 \qquad \text{Formula (1)}$$

wherein $\eta_1$ represents the viscosity of ink at 25° C., while $\eta_2$ represents the viscosity of ink at 25° C. in which water equivalent to 10 percent by weight of the entire ink weight has been evaporated.

3. The ink-jet ink of claim 1, wherein the amphiphile is a polymer having N-substituted acrylamide unit or a polymer having vinyl ether unit.

4. The ink-jet ink of claim 1, wherein the average particle diameter of the amphiphile is 10 to 300 nm.

5. The ink-jet-ink of claim 1, wherein the average particle diameter of the fine polymer particles is 10 to 300 nm.

6. The ink-jet ink of claim 1, wherein the content of said fine polymer particles is 5 to 30 percent by weight.

7. The ink-jet ink of claim 1, wherein ink viscosity at 25° C. is 10 to 300 mPa·s.

8. A recording method comprising the step of ejecting the ink-jet ink of claim 1 from a recording head to record an image.

9. The recording method of claim 8, wherein an ejection amount of the ink-jet ink is 0.1-2.0 pl per droplet.

10. The ink-jet ink of claim 1, wherein ink viscosity ratio $\eta_2/\eta_1$ of the ink satisfies the condition specified by Formula (1) below:

$$0.8 < \eta_2/\eta_1 < 5.0 \qquad \text{Formula (1)}$$

wherein $\eta_1$ represents the viscosity of ink at 25° C., while $\eta_2$ represents the viscosity of ink at 25° C. in which water equivalent to 10 percent by weight of the entire ink weight has been evaporated.

* * * * *